(12) United States Patent
Rasmussen et al.

(10) Patent No.: US 7,089,154 B2
(45) Date of Patent: Aug. 8, 2006

(54) AUTOMATIC MACHINERY FAULT DIAGNOSTIC METHOD AND APPARATUS

(75) Inventors: Søren A. Rasmussen, Ballerup (DK); Øle Døssing, Kobenhavn K. (DK)

(73) Assignee: Rovsing Dynamics A/S, Skovlunde (DK)

( * ) Notice: Subject to any disclaimer, the term of this patent is extended or adjusted under 35 U.S.C. 154(b) by 571 days.

(21) Appl. No.: 10/038,512

(22) Filed: Oct. 19, 2001

(65) Prior Publication Data

US 2003/0040878 A1  Feb. 27, 2003

(51) Int. Cl.
G06F 11/30 (2006.01)

(52) U.S. Cl. ........................................ 702/183; 714/25
(58) Field of Classification Search ............ 702/33–36, 702/56, 58–59, 113–115, 182–189; 706/2–3, 706/8, 46–48; 700/47, 50, 79–81, 286–287; 714/25–26
See application file for complete search history.

(56) References Cited

U.S. PATENT DOCUMENTS

| | | | |
|---|---|---|---|
| 5,748,500 A * | 5/1998 | Quentin et al. | 702/182 |
| 6,199,018 B1 * | 3/2001 | Quist et al. | 702/34 |
| 6,208,981 B1 * | 3/2001 | Graf et al. | 706/2 |
| 6,301,572 B1 * | 10/2001 | Harrison | 706/52 |
| 6,424,956 B1 * | 7/2002 | Werbos | 706/2 |
| 6,597,957 B1 * | 7/2003 | Beakley | 700/7 |
| 6,718,533 B1 * | 4/2004 | Schneider et al. | 717/100 |
| 6,795,798 B1 * | 9/2004 | Eryurek et al. | 702/188 |

* cited by examiner

*Primary Examiner*—Marc S. Hoff
*Assistant Examiner*—Mary Catherine Baran
(74) *Attorney, Agent, or Firm*—Darby & Darby

(57) ABSTRACT

The invention relates to an automatic fault diagnostic procedure for machines, such as steam, gas and hydro-turbines, generators, pumps, electrical motors, etc. For each of a plurality of components, for each of a number of possible faults, a total fault symptom strength value is calculated from measured data. If the value is above a predetermined value, the fault symptom strength is plotted and fitted to a trend line to determine an estimate of when the fault symptom strength will exceed a predetermined value. Output messages are then selected based on the fit.

23 Claims, 10 Drawing Sheets

AUTOMATIC MACHINERY FAULT DIAGNOSTIC METHOD AND APPARATUS

FIELD OF THE INVENTION

The invention relates to an automatic fault diagnostic procedure for machines, such as steam, gas and hydro-turbines, generators, pumps, electrical motors, etc.

BACKGROUND OF THE MENTION

Various attempts to monitor the health and make fault diagnoses of machines have been attempted. Conventionally, this is done by human experts after abnormal behaviour, such as increased vibration level, has been observed. The experts may in cases be supported by expert systems.

The fault diagnosis may include analysing vibration and process data from critical machines to determine whether the specific machine components show a tendency of imbalance, misalignment, cracks, wear or other faults.

As regards the use of expert systems, the results from such systems may merely indicate the association of a symptom with the likelihood of a potential fault, but does not predict the future development of this fault. Furthermore, expert systems are sensitive to boundary conditions of the collected data and knowledge, and may even indicate faults, which would possibly not occur in practice. In addition, such a method, when monitoring the many machine components, soon arrives at a point where the amount of data to be analysed reach the limit of the capacity of the computer executing the algorithms of the expert system.

Expert systems and other types of automatic fault detection systems also require training, and the difficulty of training an expert system for the many different types of fault and indicators thereof maybe prohibitive.

There accordingly remains a need for an improved automatic machinery fault diagnostic method and apparatus.

SUMMARY OF MENTION

According to a first aspect of the invention there is provided: a method of automatic fault diagnosis for machinery having a plurality of components, based on a reduced dataset calculated from data measured on the machinery, the method comprising: for at least one machine component, and for at least one fault that may occur in that component, carrying out the steps of: calculating for each of a plurality of symptoms for indicating that fault, a symptom value as a function of the reduced dataset calculated from measured data, combining the symptom values to give a total fault symptom strength value indicating the strength of the fault; and carrying out fault processing if the total fault symptom strength lies above a predetermined value.

By calculating parameters representing the strength of a number of physical symptoms, and then combining these parameters to give a value of total fault symptom strength, it is possible to automatically evaluate the state of a component with regard to each of a number of possible faults. This approach works much better than expert systems or approaches using automatic training of a system using training data because the method according to the invention is able to focus on the specific features of the dataset indicative of each fault.

Furthermore, by taking into account a classification of the machine state the method may only use data from relevant machine states. For example, data taken when a machine is idling may be irrelevant to the case when the machine is operating at full power.

The step of combining the symptom values may include calculating the sum of the symptom values raised to the power of a predetermined constant and taking the predetermined constant root of the sum. In this way, it is avoided that a single outlier value has too great an effect on the final calculation, while still combining all the symptom values.

The step of combining the symptom values may include multiplying the combined symptom values with a value representing the strength of the symptoms.

The signature dataset may be a database. The method may include automatically taking measurements of the component when predetermined conditions occur, such as at regular intervals, and testing whether the new measurements represent a change on the reduced data stored in the signature database. If there is no change, preferably simply this fact is recorded, alternatively the data may simply be abandoned. This approach avoids adding unnecessary data to the signature database thereby reducing the amount of data required to be stored.

The fault processing may include executing different program code depending on the calculated total fault symptom strength.

For example, if the total fault symptom strength lies below a first predetermined value, no further processing may take place for that fault. This allows fault symptom values which might have arisen by chance to be ignored.

If the total fault symptom strength lies above the first predetermined value the method may, with respect to that fault, switch from a first mode in which the value of the total fault symptom strength is not recorded on an ongoing basis to a second mode in which the total fault symptom strength is recorded on an ongoing time series basis. The recordal of the value of the total fault symptom strength each time the fault system strength is calculated allows the time evolution of the fault to be recorded.

The fault processing may further include outputting suitable warning messages, for example on the first occasion that a fault has been detected, and/or when the total fault symptom strength exceeds a second predetermined value indicating that the fault is serious or critical.

The method may include predicting the likely value of the total fault symptom strength at various future times, based on the time series. Warning messages may be output when the time series indicates that the total fault symptom strength will exceed a predetermined value after a predetermined time.

The method may include predicting the future values of the total fault symptom strength by automatically fitting the time series data to a plurality of different models and using the best fit. For example, the time series may be modelled as a straight line or as a polynomial of given order and the best fit taken.

The method may include automatically calculating the faults for each component when predetermined conditions occur. Conveniently, the predetermined condition may include the elapse of a predetermined time after the calculation was last performed whereby the system monitors the health of the components on a regular basis.

Preferably, the method includes measuring machine data and updating the reduced database on an ongoing basis.

In another aspect, the invention relates to a method of automatic fault diagnosis including for each of a plurality of components of machines, carrying out the steps of: for at least one possible fault in the component: calculating a total fault symptom strength value from measured data indicating the strength of the fault; and, if the total fault symptom strength value lies above a predetermined value for that fault, recalling stored data relating to the total fault system strength value as a function of time, fitting the stored data to a trend line and predicting the time when the total fault symptom strength value will exceed a predetermined value, selecting a message based on the total fault symptom strength value and the predicted time, and outputting the selected message.

In this way the time to failure of the component may be estimated and useful messages provided to an operator to allow maintenance to be planned.

The invention also relates to a computer program system for carrying out the method. The computer program may include a number of program blocks recorded on a data carrier, the program blocks being arranged to run on various computers of a computer system including a number of computers, or on a single computer.

The computer program system is preferably implemented in an object oriented language. A machine component object is preferably provided for each of the machine components for which autodiagnosis is performed. Preferably, the machine component objects are specific instances of a general object class for the type of machine component.

This approach brings real benefits in setting up the system for a particular plant. A computer system may contain general classes of object, such as a shaft, a bearing and a foundation. Each of the components of a piece of machinery can be a child of the relevant general class, inheriting the general properties of the class but further programmed with the specific features of that particular component.

In particular, the general class of object may include members for each of the different possible faults for objects of the class.

The invention also relates to a system for automatically outputting a fault diagnosis for at least one possible fault, including code for carrying out the method discussed above.

In machines used in power plants, there are often several hundred critical components, and since several machines are in use simultaneously, and these machines further have to be keep under surveillance simultaneously, the amount of data from the involved measuring transducers increases very quickly. Embodiments of the invention achieves a reduction of the observed data.

Furthermore, the invention may take into account particular behaviour of the individual critical machine components during different operating conditions prior to analysing acquired data therefrom. In this way, the measured data may be interpreted more completely. Since different specific features are required from the acquired data, the "raw" data may be repeatedly subjected to alternative signal processing procedures to enhance particular fault features before the results are interpreted. The measured data may, for instance, be subjected to windowing, Fourier transformation, statistical estimation, filtering, integration, differentiation, wavelet-transform or alternative signal processing methods, resulting in a fault specific reduced dataset or "signature". The reduced dataset may then be interpreted, using a particular Method. The signature is the result of a sequence of signal processing functions that transforms the observed data to a domain that enhances fault specific features. Specific observed parameter values, such as temperature or vibration level may be insignificant in one operating state and, in another operating state, may indicate a critical condition for the machine component. The actual operating state of the machine should accordingly be considered, before the measured data are interpreted.

The procedure, according to the invention, may use a machinery fault class library including references to specific signatures, i.e. specific pieces of data in the dataset, calculated from signals acquired from sensors placed at specific locations oil said machine.

The analysis may be performed on the heavily reduced data sets being stored in the server database. As a result, the time it takes the auto-diagnostic software to process the stored data is reduced considerably. Furthermore, since the auto-diagnostic software in addition works with signatures specific to particular kinds of faults in particular components, the risk of misinterpretations of the results and, hence, the untimely issue of false alarms are also reduced considerably.

BRIEF DESCRIPTION OF THE DRAWINGS

For a better understanding of the invention, embodiments of the invention will now be described, purely by way of example, with reference to the accompanying drawings in which.

Like or corresponding components are given the same reference numerals in the different figures.

DETAILED DESCRIPTION

Figure 1:
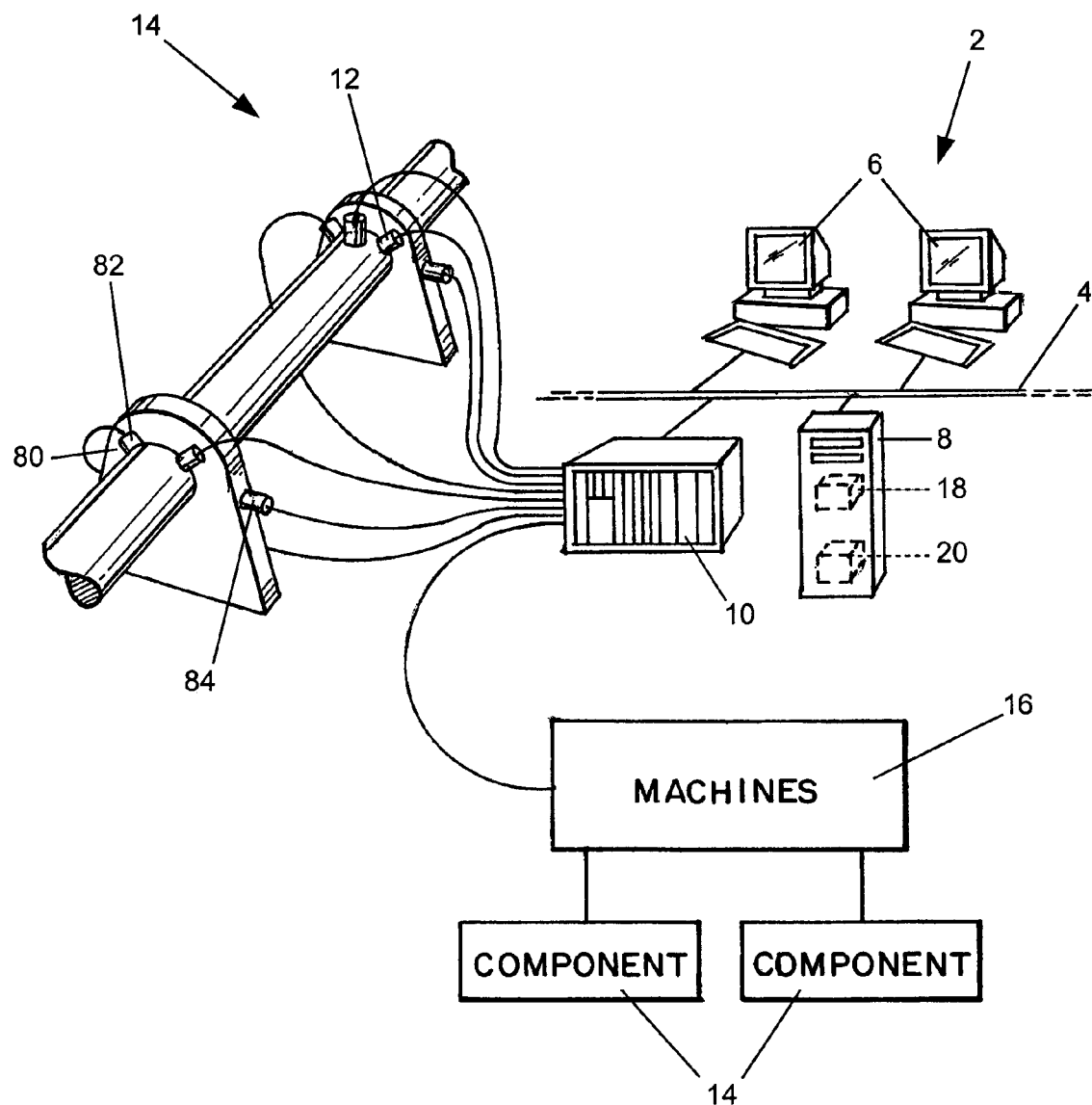
FIG. 1 illustrates a system according to the invention.

Referring to FIG. 1, a system according to an example of the invention includes a computer system 2 having a network 4 connecting a plurality of workstations 6, a server 8 and a signal processing unit 10.

The signal processing unit 10 is connected to a number of sensors 12 on a machine component 14, here a rotor. In practice, sensors 12 will be provided on a number of components 14, optionally on a number of machines 16 which may have a plurality of components 14. A number of signal processing units 10 may be provided if convenient.

The server 8 includes at least one processing unit 18 and a memory 20, the latter storing program code 22 for automatically diagnosing system faults. The skilled person will appreciate that the memory may include RAM, EEPROM, hard and floppy drives, DVD and other data storage means.

Program code may also be provided on workstations, signal processing unit 10 or indeed on any other computer connected to the network.

A Fault Diagnostic System of program code 22 runs on the central server 8 and optionally also any number of clients 6 (operator/user terminals), which are connected through local or global networks 4. The central server 8 uses a general database management system for sorting, classifying and processing information or for activating an alarm when a fault occurs. The code 22 uses a particularly developed scientific diagnosis language syntax (see appendix A) and the method formalises the fault features as seen in the fault selective signatures. The semantics is founded on physical mathematical models and empirical knowledge for the particular faults and components.

During operation, the central database server 8 executes simultaneously several processes such as a data server, a user interface, an alarm server, graphical data presentation, etc. Most important for the present patent application is an "AutoDiagnostics Inference Engine" (auto diagnosis server), a process carrying out the diagnostic method for all components of all machines connected to the Fault Diagnostic System.

Figure 6:
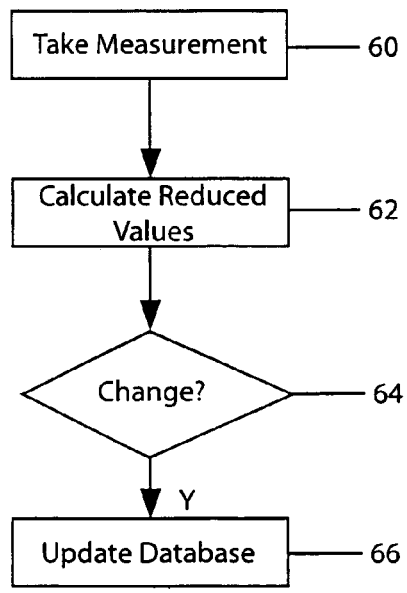
FIG. 6 is a schematic flow diagram relating to updating data.

Each processing unit 10 measures data from the sensors and updates data stored in a measurement database 44 on the central server on a regular basis by monitoring inputs on the sensors to obtain measured sensor values, as illustrated in FIG. 6. Measurements are taken periodically (step 60). Fault specific reduced data is calculated from the measurements (step 62) for each of the possible faults. The reduced data is then compared (step 64) with data stored in measurements database 44, and if there is a significant change the data in database 44 is updated (step 66). Otherwise, the new reduced data is discarded. In this way, vast amounts of identical data are not stored in the measurements database 44, thereby keeping measurements database 44 manageable.

The measurements are used to determine the classification of the machine state and the reduced data is compared with data stored for the same machine state. The machine states may include idlying, run-up, full power, or other states as appropriate. The reduced data is stored in the database 44 together with the classification of the machine state.

The steps carried out by the autodiagnosis code 22 in the central server 8 will now be described with reference to FIGS. 2 to 5.

Figure 3:
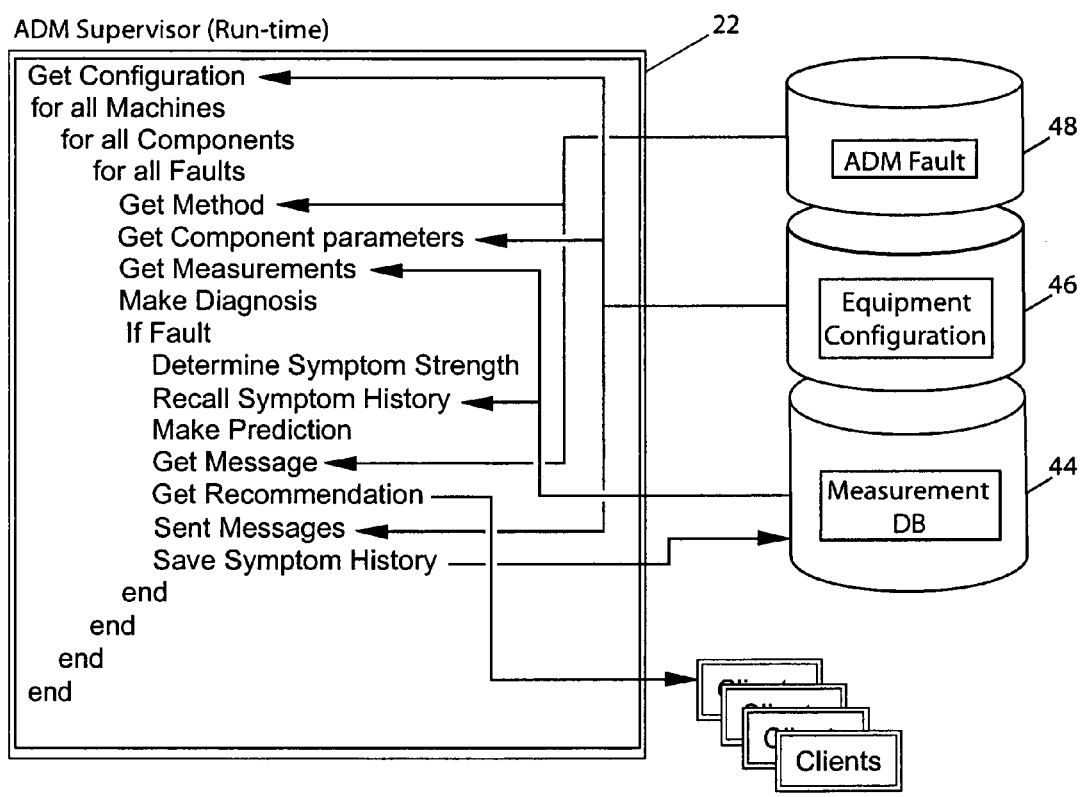
FIG. 3 is a schematic diagram of fault processing overall.

An "AutoDiagnosis Supervisor" process runs transparently in the background of the system and causes fault calculation to occur for each component and each fault and issue messages to the user, as illustrated in FIG. 3. As shown in the pseudo code, the AutoDiagnosis Supervisor process runs through all machines, all components and all faults to get individual methods from the fault library, component parameters and signatures from the configuration database, and executes the diagnosis in accordance with the method. The AutoDiagnosis Supervisor process may be initiated either on a fixed schedule or when triggered by an event, for example an alarm. In the case that faults are detected messages and recommendations are gathered from the databases and issued to all clients (users) on the system.

The processing for each fault may be run sequentially for each machine, each component, and each fault, as indicated schematically in FIG. 3. Alternatively, it may be preferable to commence a separate process for each component, or even each fault, when predetermined conditions occur, such as at regular intervals. In this way, some components can be checked more frequently than other components.

FIG. 3 also illustrates the storage used at various points of the method. Reduced datasets obtained from measurements are stored in the database 44. A further database 46 stores the configuration of the equipment, and a yet further database 48 stores a fault library, including the code for each possible fault. All these may be stored in memory 20 of the server 8 or elsewhere as convenient.

Figure 2:
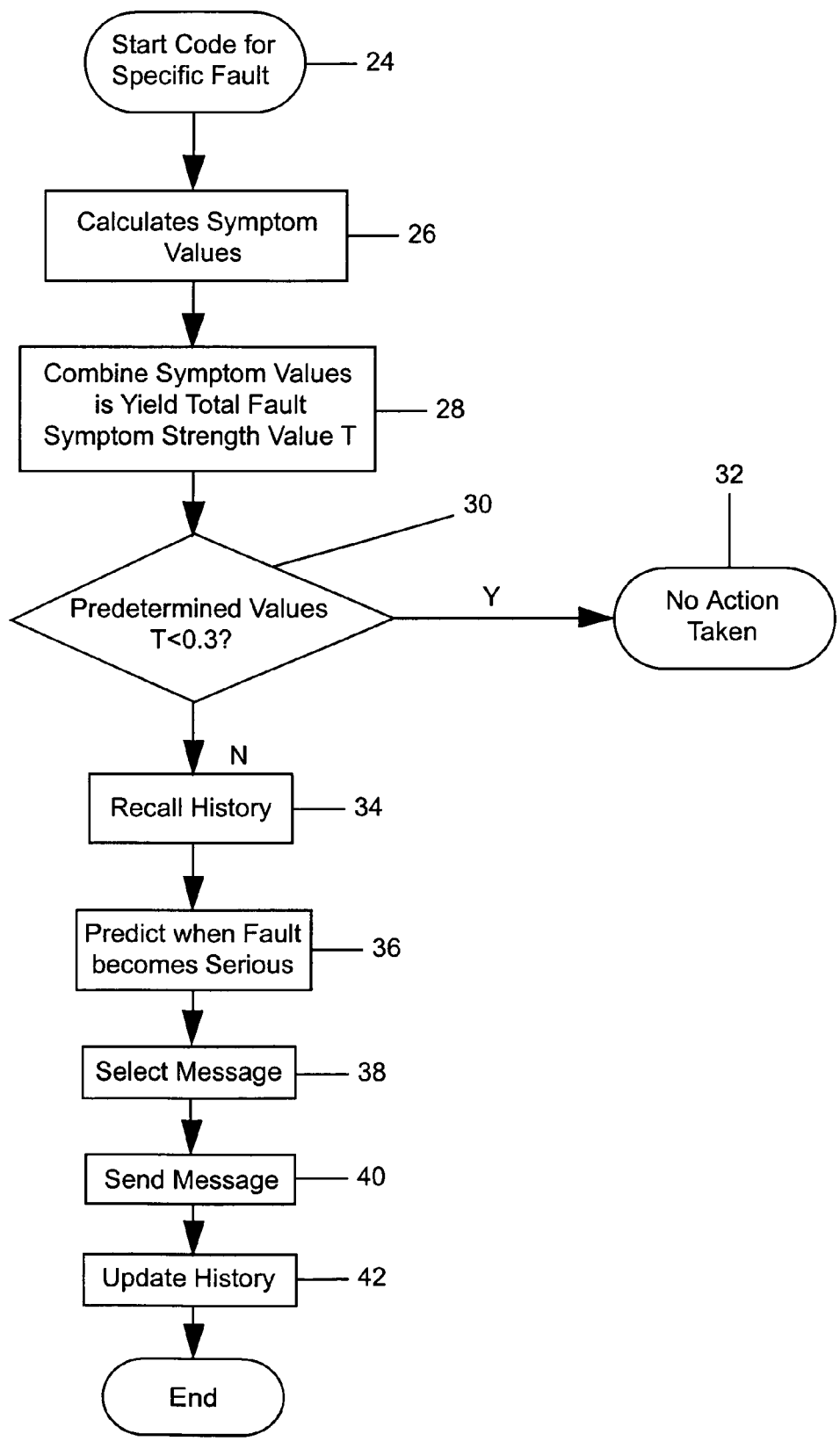
FIG. 2 .is a flow diagram illustrating processing for a single fault.

FIG. 2 illustrates the calculations carried out by code 22 for a specific fault on a specific component. The specific fault may include unbalance of a rotor, misalignment, instability, and various other possible faults that will depend on the specific component.

The code for the specific fault is started in step 24. Then, in step 26 symptom values for each N possible physical symptoms of the fault is calculated, where N is a positive integer.

An example of how this works is presented below for the case of one possible fault, unbalance of the rotor. In this example, the symptom values in this example include symptom strength values $v_i$ which indicate the relative strength on a scale of 0 to 1 of the deviation from a baseline value measured in the component when operating the same class of operation and symptom severity values $w_i$ which are absolute values.

Depending on the fault and the symptom, data is selected from the appropriate classification or classification of machine states. Thus, for some fault symptoms, data from one machine state will be relevant, whilst other fault symptoms may require data from another machine state. The symptoms take data from the signatures (the reduced data stored in database 44) from one or more classifications of machine state data as appropriate. Each symptom cycles in turn between data from different machine states if required.

Next, in step 28, the symptom values $v_i$ are combined to give a total fault symptom strength value T. In the specific example, T may be given by T=Fuzzymin($w_1 \ldots w_n$), Fuzzymax ($v_1 \ldots v_i$)

The function Fuzzymin gives a fuzzy minimum of its arguments and Fuzzymax gives a fuzzy maximum of its arguments.

In step 30, it is determined whether to take any action. If the total fault symptom strength value is below a predetermined value, for example in the range 0.3 to 0.4, no further action is taken with regard to that possible fault, and the processing for the fault ends (step 32). This allows small, probably spurious fault values to be ignored.

The total fault symptom strength value history is then recalled (step 34), and a prediction made based on the history as to when the fault becomes serious (step 36). Depending on the total fault symptom strength value and the prediction, one of a possible number of messages is selected (step 38) and sent (step 40). The new total fault symptom strength value is added to the symptom history (step 42).

A message may be sent, for example, the first time the fault is detected, and then again when sufficient history data has been collected to make a prediction with confidence limits less than a predetermined value. An alarm message may be sent when the total fault symptom strength value exceeds a predetermined value.

The method provides a total fault symptom value, a scalar value in the range 0–1, and is classified in three degrees of severity: Fault Detected, Fault Prediction and Critical Fault. Take as an example, the fault of "wear and tear", becoming detectable, i.e. exceeding the significance level of detection. At an early stage, the fault development may be far from critical and the fault is simply detected, without the system having enough symptom data to provide an unambiguous prediction of the fault development trend. After some time, the fault may tend to develop in a significant yet predictable manner, as function of time. The system is then capable of predicting how the fault develops in the future, and, furthermore, estimating the date at which the fault will be critical. As the time for predicted and critical faults become available, the operator has the opportunity to performing scheduled plant maintenance/corrective activities and enjoy the benefits of preventing unscheduled plant outages. A critical fault is a fault that has developed to a level considered dangerous for continued operation. The occurrence of such faults nearly always implies an immediate closedown of the machine in question for repair or exchange of defective components. Any of the three fault levels cause alarm messages when first detected with an indication of the machine, the component, the type of the action to be taken together with the prediction of future fault symptom developments, if predictable.

An important feature of the system is that it provides output messages clearly identifying the fault, taken from the message database in the data store 48. In this way, the operator can clearly identify the fault that the message relates to.

A plant may have several machines, each machine may have several components, each component may have several potential faults, each fault may have features to be seen at many signatures, but each fault/signature component has only one method to determine the fault symptom. The AutoDiagnosis supervisor (inference engine) gathers for each fault, measured signatures from the measurement database, method from the fault library and executes the method to determine partial symptom strength.

Figure 13:
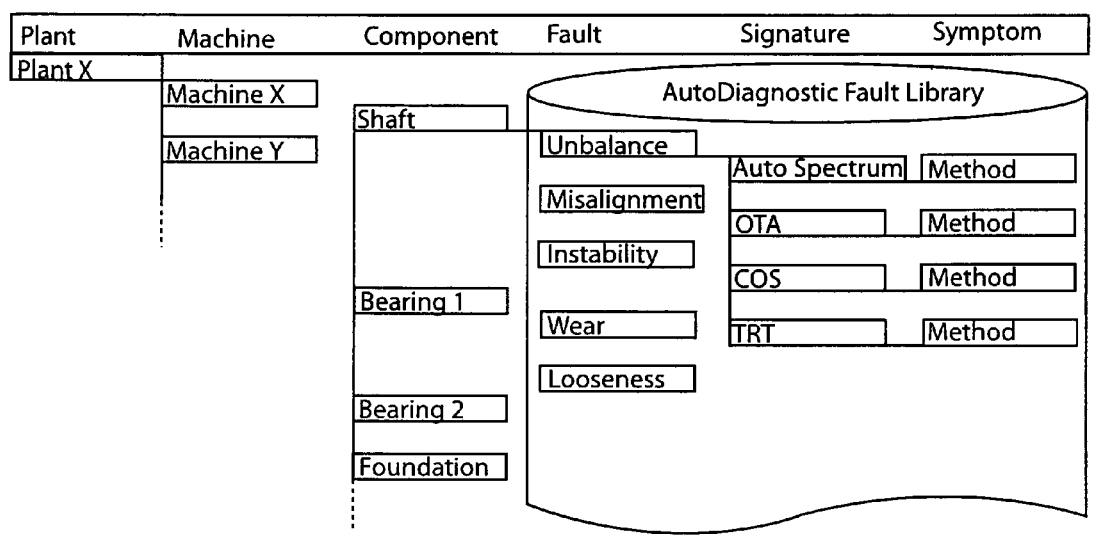
FIG. 13 illustrates the structure of the Fault Library.

The fault library 48 is organised in a hierarchy that reflects the plant configuration as illustrated in FIG. 13. It will be appreciated that in the object oriented approach used in the example, the objects stored in the fault library may include the code needed for calculating and detecting the corresponding fault. Code for causing processing of each of the various faults are stored in the fault library 48, as objects relating to the different components, the faults for each component, the signatures for each fault and the methods for each signature.

The fault detection code 22 stored in the fault library 48 is conveniently programmed in an object oriented programming language with inheritances A separate computer program object may be provided for each machine component.

Figure 4:
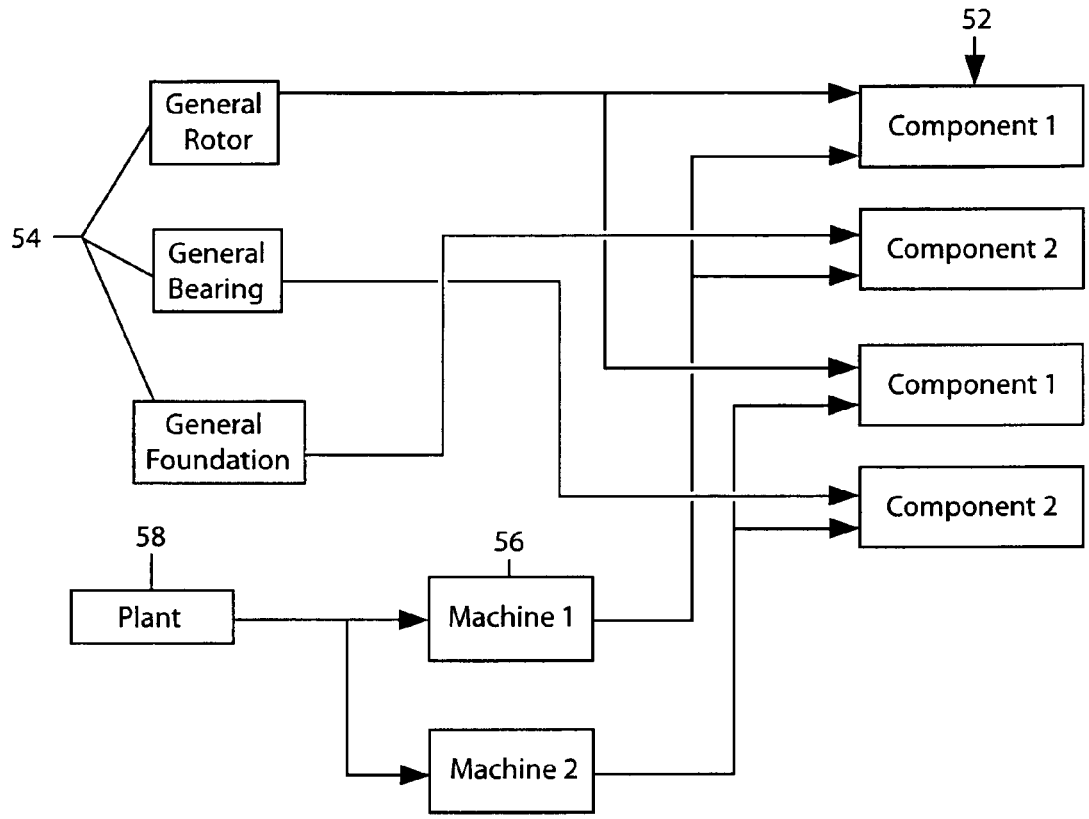
FIG. 4 is an inheritance diagram for component classes.

FIG. 4 illustrates the inheritance of these separate computer program objects 52. A plurality of general fault class objects 54 are provided, each corresponding to a type of component such as a rotor, a bearing, or any other component. The possible faults for that type of object are encoded in ache general fault class objects 54. Each specific object 52 inherits from one of these general fault class objects, but further includes component specific information such as size, intended running speed and the like.

Conveniently, the separate computer program objects 52 further inherit from a class for each machine 56 and each plant 58.

By programming in this way it becomes very easy to update the system to detect faults in new objects. Almost all of the code is provided in the general class, and this code needs little alteration for the new component.

Figure 5:
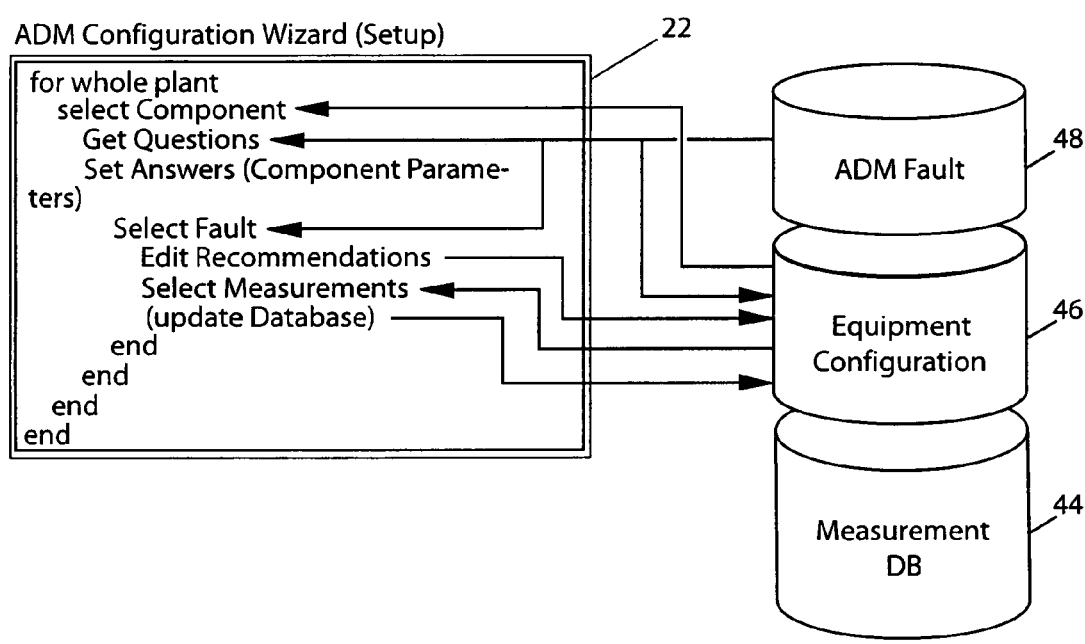
FIG. 5 is a schematic diagram of the configuration Wizard.
Figure 7:
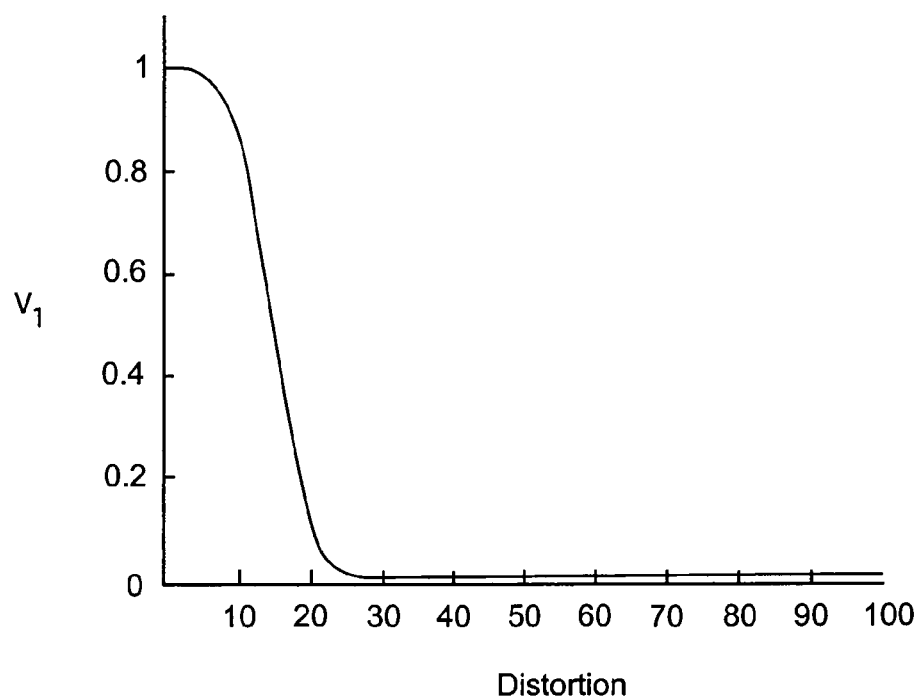
FIGS. 7 to 11 illustrate a first symptom of rotor unbalance.
Figure 8:
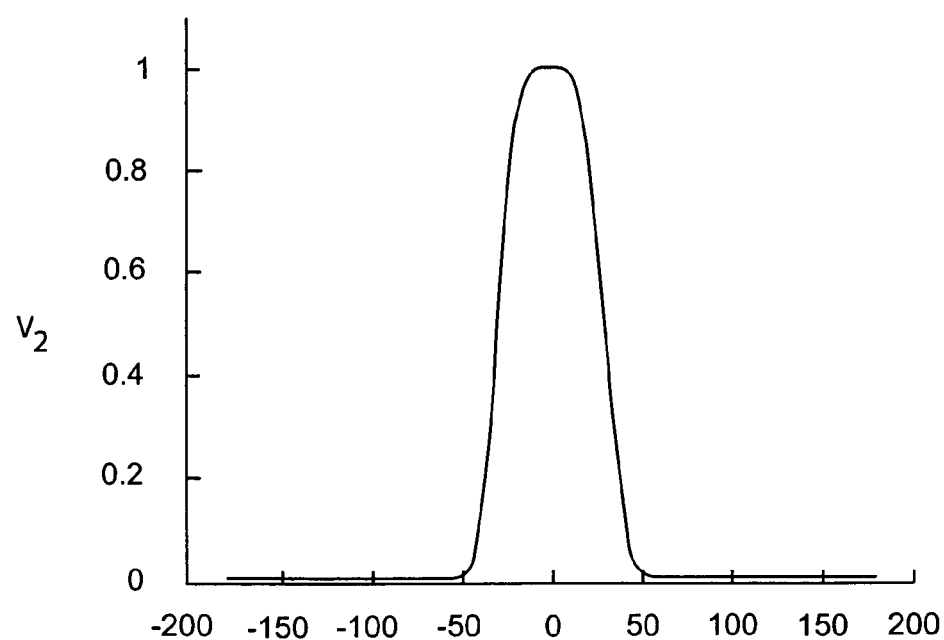
Figure 9:
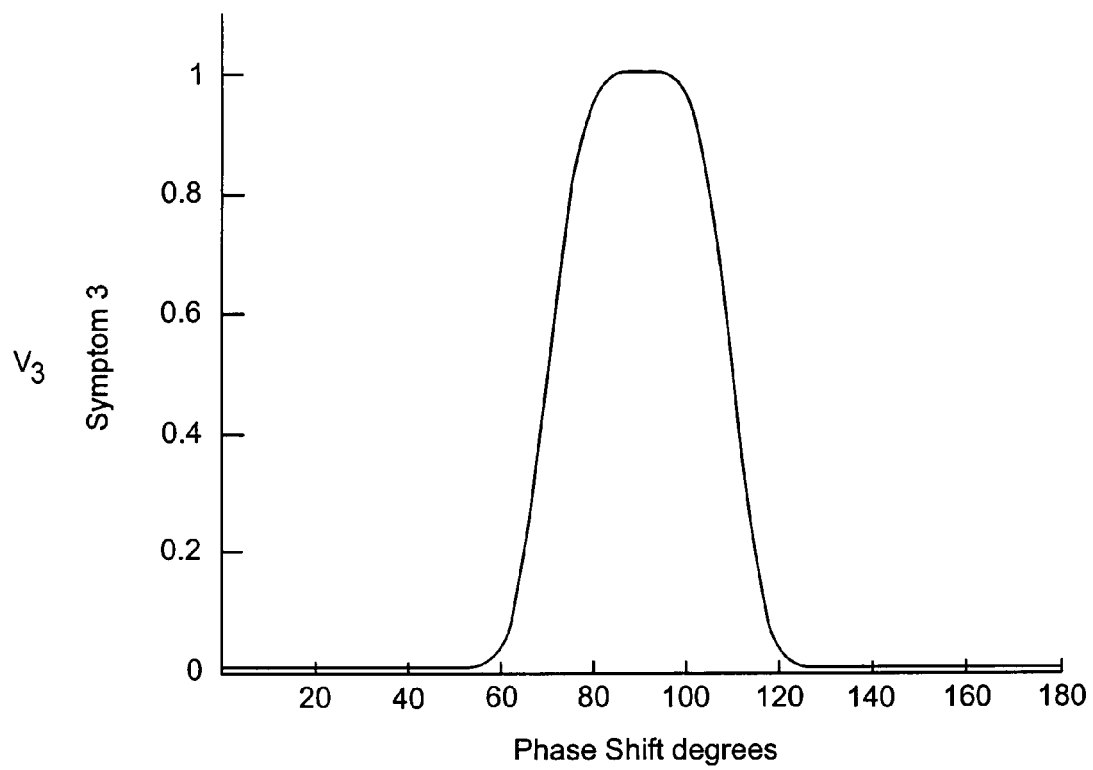
Figure 10:
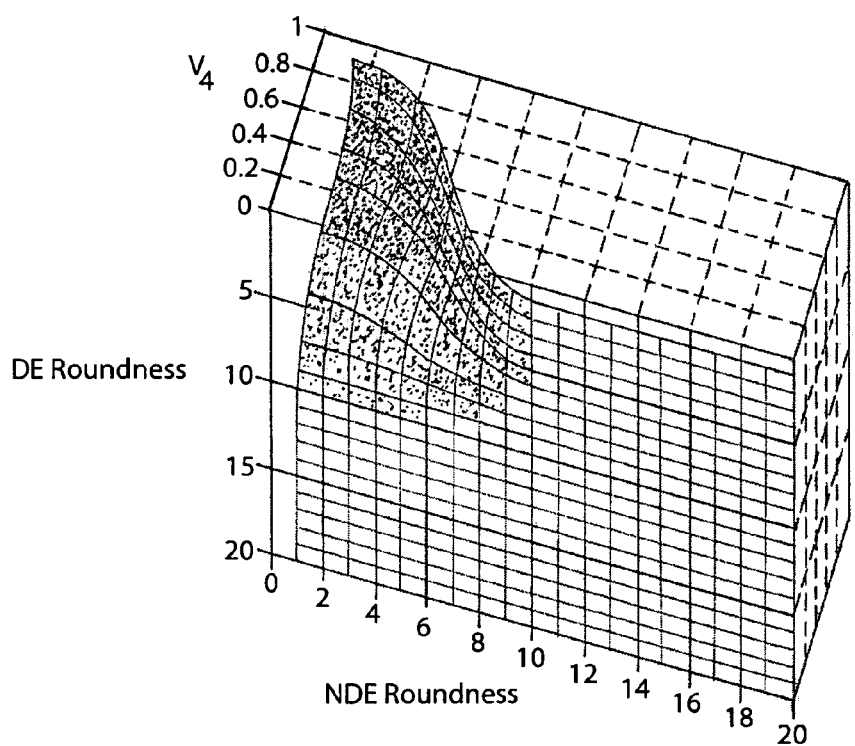
Figure 11:
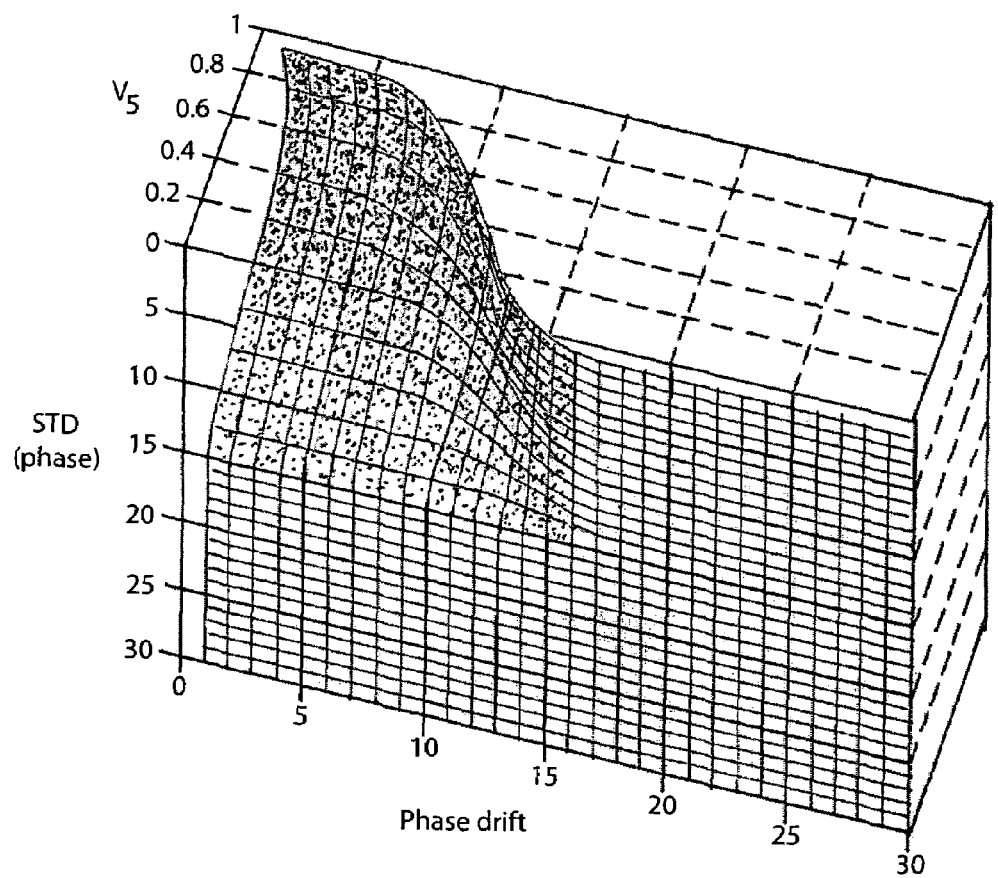
Figure 12:
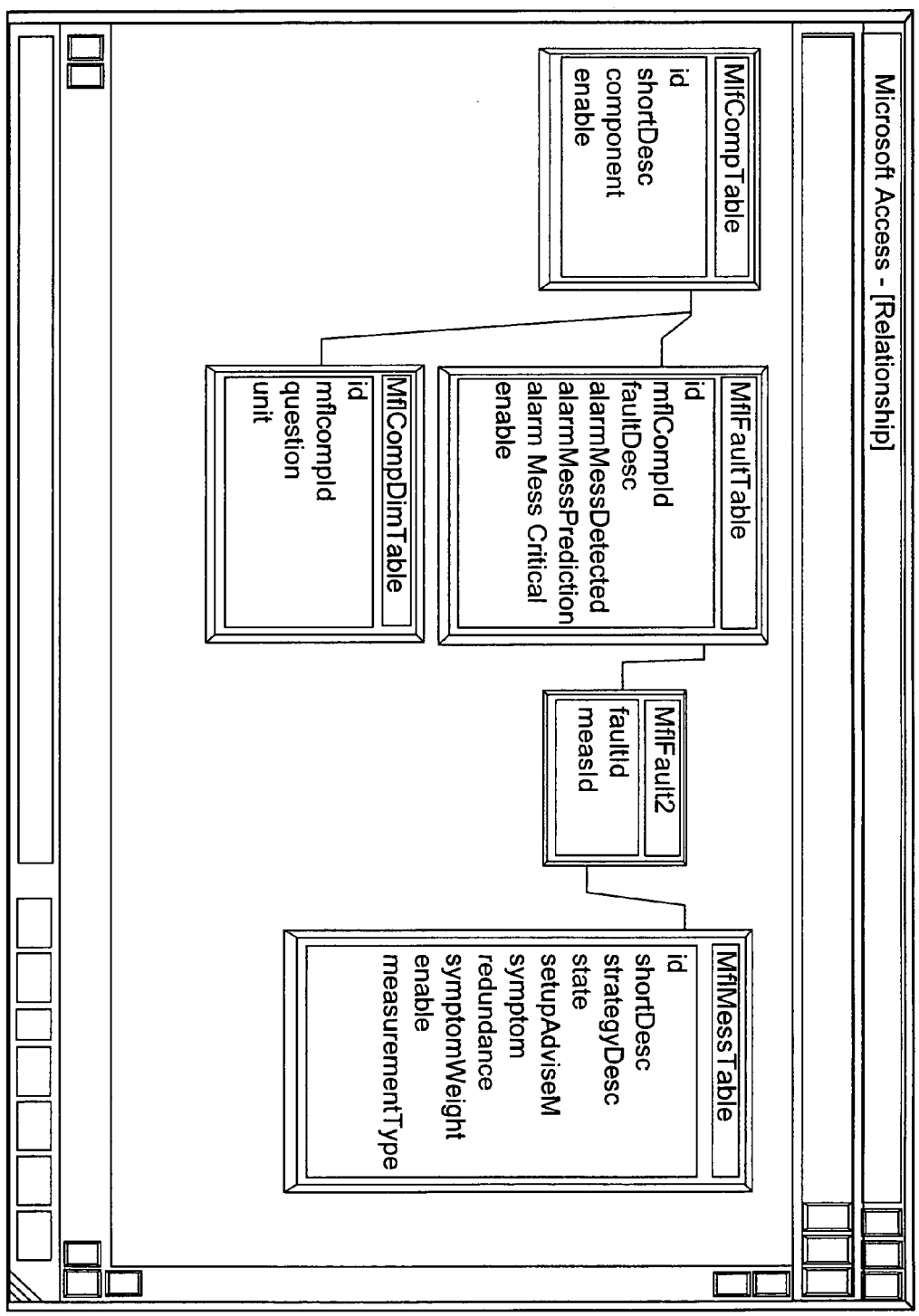
FIG. 12 illustrates output of the configuration Wizard.

Indeed, the new code may be generated by a wizard as illustrated in FIG. 5. The AutoDiagnosis Fault Library Wizard provides tools for building and editing the underlying Fault Class Methods. The information is accommodated in data store 48 containing all information regarding the machine component, component specific parameters, fault description and alarm messages, descriptive information on how the signatures shall be measured and the diagnostic class method. As the pseudo code in the figure suggests, the wizard requires user input ("Answers") relating to features of the component ("Questions") and the user input is used to update the configuration database 46 for every machine and component in the plant. An example user input screen is shown in FIG. 12.

For every potential component fault, specific measurements, as already configured for the machines, are associated with this fault and, as implied, with a fault class method in the fault library.

For a better understanding, a glossary of terms used herein follows.

Fault: A fault is a mechanical deviation of the component, that endanger the intended functionality, and which has, may have or will have an impact on the reliability or efficiency of the component, if it develops further.

Signature: A signature, is the result of a sequence of signal processing operations that transforms the observed data into a domain that enhances fault specific features, such as autospectrum and the Selective Envelope Spectrum, which reveals changes in frequency components, and detects amplitude modulations and impulses in a particular frequency range respectively.

Fault Class Method: The Fault Class Method is a formalised diagnostic method to determine the Symptom Strength for a particular fault on basis on one or several signatures acquired from a particular machine and machine component. The Method itself is a procedural diagnostic syntax of a scientific diagnostic language, developed specifically to provide a rational and focused semantics for determining faults from acquired signatures. Syntactic elements of an example Fault Class Method are listed in Appendix A.

Symptom Strength: reflects the degree of development state of the individual faults as seen from the associated signatures.

System Elements: The system has a set of application elements that provides functionality for establishment and maintenance of the library of Fault Class Methods, to configure Fault Class objects, viz. a representation of a physical plant of machines/components/faults and associated measurements and a process that executes the Methods on the acquired signatures:

The system may typically be installed and operated on a plant according to the following procedure: Initially, the critical machines 16 and their constituent components 14 to be kept under surveillance are selected. Subsequently, a plurality of transducers or sensors 12 are mounted on the components 14, for instance accelerometers and proximity probes (for absolute and relative vibration measurements respectively), tacho probes (for measuring rotational speed), thermocouples (for measuring temperatures) flow sensors (for measuring liquid flows), gap probes (for measuring relative distance), etc. These transducers 12 are connected to one or several signal processing units 10 (SPUs), capable of quantisation, processing and caching the information from the individual transducers and eventually provide data communication to the central system server via standard networks. A typical plant, such as an electric power plant or a cement manufacturing plant may have several hundred transducers 12.

EXAMPLE

The principles of configuration and execution of auto diagnosis will now be illustrated for a typical machine component; a rotor. In the following, one practical example of configuration and operation of the Fault Diagnostic System will be explained. The example concerns a rotor supported in journal bearing. The system's Machine Fault Library includes three general classes of rotors characterised by mechanical configuration and applicable instrumentation; one of these, the rotor with journal bearings, is selected.

FIG. 1 shows a rotor 14 as part of a generic machine supported by two journal bearings 80. At each bearing 80, two displacement probes 82 and one accelerometer 84 are mounted. The signals from the displacement probes 82 and the accelerometer 84 are fed to a signal processing unit 10 for calculating the particular signatures, that subsequently are sent to the central server 8 and saved in the database 44.

The potential faults for the rotor are unbalance, misalignment, bowed shaft, cracked shaft, bearing instability, mechanical looseness and rotor rub.

In the example, consider the case of one of these faults "unbalance". Four (4) signatures per 6 sensors (totaling 24 signatures) are used to determine five partial symptoms, here distortion, local phase, roundness, phase trend and $\omega^2$-law. These partial symptoms are combined in a fuzzy logic sense and scaled by the severity of the vibration level to provide the current Total Symptom Strength for the fault: unbalance.

The three transducers 82,84 on each of the two bearings 86 supporting the rotor 14 comprise, as previously mentioned, two radial mounted displacement probes 82, measuring relative displacement between shaft and bearing house and one accelerometer 84 measuring the absolute acceleration of the bearing house. If the displacement probes are mounted at an angle which to one another, with respect to the axis of the rotor, which differs from 90°, the system ensures that the signals from said probes are geometrically transformed into signals corresponding to an angle separation of 90°. Another displacement probe provides a rotor angular reference signal for Order Tracking Analysis and Shaft Speed detection.

The sensor signals can thus be summarized as follows:
Displacement probe, X direction, Driving End, XDE.
Displacement probe, Y direction, Driving End, YDE.
Accelerometer on Driving End bearing, ACCDE
Displacement probe, X direction, Non Driving End, XNDE.
Displacement probe, Y direction, Non Driving End, YNDE.
Accelerometer on Non Driving End bearing, ACCNDE Measurement Strategy All the symptoms for unbalance on rotors with journal bearings are calculated from OTA, Order Track Analysis. The frequency range should be selected to allow OTA to produce measurement for the first four multiples of the rotating frequency. OTA should be recorded during run-up, and OTA time history should be kept.

Signature

All the symptoms for unbalance on rotors with journal bearings are calculated from a signature known as OTA, Order Track Analysis. The amplitudes of vibration measured by the sensors 82,84 for the first four multiples of the rotating frequency and the first order phase are used. Four kinds of information are used; current values, baseline, time history data and bode data from last run-up.

Two symptom values, which may be called a symptom severity and a symptom strength may be calculated for each symptom in the example. In other arrangements, only a single symptom value might be calculated.

There are six symptoms on unbalance for rotors with journal bearings implemented:
Symptom 1. Dominating first order
Symptom 2. Same vertical and horizontal phase shift over rotor
Symptom 3. 90 degrees phase shift vertical/horizontal
Symptom 4. Orbit roundness <5
Symptom 5. First order phase steady versus time
Symptom 6. First order proportional to RPM$^2$ during run-up Symptom Strength The symptom strength for each of the symptoms of the fault unbalance is calculated by comparing the current first order amplitude compared to baseline. As amplitude, the rms sum from all six sensors is used. The accelerometer readings are integrated to displacement with use of the RPM before the rms summation.

FaultStrength=log10{(current first order rms)/(baseline first order rms)}.

The fault strength may also be considered to be a symptom strength for each of the symptoms of the fault. In embodiments, different symptom strengths may be calculated for each symptom.

Symptom Values

Symptom 1. Dominating First Order

On the current OTA data, distortion is calculated. Distortion is defined as:

$$\text{distortion} = 100 \cdot \frac{\text{total rms of orders } 2, 3}{\text{total rms of orders } 1, 2, 3}$$

The rms is taken as a (squared) sum over all available sensors. The accelerometer values are integrated into displacement with the use of the current RPM before the summation. A dominating first order will set the distortion to near zero. A smooth function fuzzygauss then transfers the distortion value into a symptom value between 0 and 1. See FIG. 1 for the relation between symptom 1 and distortion. The symptom limit (symptom=0.5) is initially set to a distortion of 15%.

Symptom 2. Same First Order Phase Shift Over Rotor for Vertical and Horizontal Directions, Respectively From the current OTA data, the first order phase shift over the rotor is calculated in vertical and horizontal directions respectively. A smooth fuzzygauss function is then applied on the difference between the phase shifts. The limit (symptom=0.5) is initially set to 0±30 degrees. See FIG. 2.

Symptom 3. 90 Degrees First Order Phase Shift Between Vertical and Horizontal Directions From the current OTA data, the first order phase shifts between vertical and horizontal directions are calculated for both sides of the rotor respectively. Then a vector addition, using the first order amplitude, is performed on the two sides to produce a "total" phase shift. A smooth fuzzygauss function is then applied on the resulting phase. See FIG. 3. The limit (symptom=0.5) is initially set to 90±20 degrees.

Symptom 4. Orbit Roundness<5

From the current OTA data the first order orbit roundness is calculated. The major and minor axes of the orbit ellipse are calculated from the first order magnitude and phase. Roundness is then defined as the ratio between the major and minor axes. This means that a circle has roundness one, while a flattened ellipse has a greater roundness. (The term roundness is misleading, but is used in this fashion by many authors). The roundness is calculated for both bearings and then combined in a smooth fashion by the function fuzzymax. Finally, a smooth function fuzzygauss is applied to get the symptom. See FIG. 4. Initially, the symptom limit (symptom=0.5) is set to a roundness of 5.

Symptom 5. First Order Phase Time History Standard Deviation and Drift <10 Degrees For all six sensors, the first order phase time histories are loaded with GetHist. Initially, the histories from the last 20 days are loaded. The corresponding time vectors, which may be different for each sensor, are also loaded. The phases are unwrapped to avoid steps in the time histories. For a first partial symptom the standard deviations for all six phase time histories are calculated. The six standard deviations are combined with a smooth fuzzymax function. The result is converted to the first partial symptom with a smooth fuzzygauss function; initial limit (symptom=0.5) is set to 10 degrees.

Next, a linear regression is performed on the time vector and phase time history for each sensor. A function linreg calculates the linear regression coefficient, weighted with the square of the correlation coefficient. The coefficients for the six sensors are smoothly combined with a fuzzymax function. Then the total drift during the last 20 days is calculated and converted to the second partial symptom with a smooth fuzzygauss function; initial limit (symptom=0.5) is set to 10 degrees. Finally, the two partial symptoms (phase standard deviation and phase drift) are combined in a smooth fuzzymin function. See FIG. 5.

Symptom 6. Vibration Amplitude Proportional To RPM^2 for Low RPM in Last Run-Up

For all six sensors, the first order amplitude versus RPM and the corresponding RPM parameters are loaded with the function GetBode. From the RPM parameters (RPMmin, RPMmax, number of RPMs), RPM vectors are calculated for each sensor. Initially, only RPM values up to 70% of the first critical RPM are considered. For those RPM values, a "Squareness Coefficient" is calculated with the function squareness. This coefficient tells how large part of the first order amplitude RPM history that is proportional to $RPM^2$. The accelerometer readings are integrated to displacement before the Squareness calculation. The Squareness coefficients for all six sensors are combined with a smooth Fuzzymin function.

Total Fault Symptom Strength

Finally, the Total Fault Symptom Strength can be determined:

$$TotalSymptomStrength = Fuzzymin(\{Symptom\ Value(1):(6)\}) * Fuzzymax(\{SymptomStrength\})$$

Thus, if several of the symptoms are not present, the corresponding SymptomValues will be low leading to a low TotalSymptomStrength. Only if the symptoms are present will a high TotalSymptomStrength be obtained, even in the presence of significant vibration. This makes it easier to for the method to distinguish the fault.

This new parameter (TotalSymptomStrength) is saved as function of time and Machine State and is used in the Fault Strength Model for prediction of fault development rate and residual safe operating life for the component.

The skilled person will realise that the system is not limited to the example presented above. The system is capable of detecting, not just unbalance symptoms in a rotor, but also a variety of symptoms of a variety of types of fault in a variety of components in a variety of different types of plant.

In particular, the details of the program steps and flow charts may be modified whilst remaining within the scope of the invention.

APPENDIX: Implemented Method Functions

To definine the Fault Class Methods, the formal syntax of the Scientific Diagnostic Language provide the functions shown in the following table.

| binary | Function | Description |
|---|---|---|
| = | set(a,b) | : a=b. Assigns a value to a variable (adds it to the library) |
| + | add(a,b) | : a+b. Adds two VALUEs |
| - | sub(a,b) | : a-b. Subtracts two VALUEs |
| * | mul(a,b) | : a*b. Multiplies two VALUEs a*b |
| / | div(a,b) | : a/b. Divides two VALUEs a/b b!=0 |
| | delete(x) | Removes a variable from the workspace |
| | sin(a) | Calculates trigonometric function sin of VALUE |
| | cos(a) | Calculates trigonometric function cos of VALUE |
| | tan(a) | Calculates trigonometric function tan of VALUE |
| | ctranspose(X) | Matrix transposed and complex conjugated (') |
| | transpose(X) | Matrix transposed, (non-conjugated) (X.') |
| | times(X,Y) | : X(i,j)*Y(i,j). Array multiply, element by element (.*) |
| | rdivide(X,Y) | : : X(i,j)/Y(i,j). Right array divide, element by element. (./) |
| | ldivide(X,Y) | : Y(i,j)/X(i,j). Left array divide, element by element. (.\) |
| ^ | power(X,Y) | : X(i,j)^X(i,j). Array power, element by element. (.^) |
| | sqrt(X) | Array square root, X(i,j)>=0 |
| | sum(X) | Sum of elements in vector X. |
| | testeq(a,b) | : a==b. Test – Equal.. True=>1, false=>0 |
| | testneq(a,b) | : a!=b. Test – NotEqual.. True=>1, false=>0 |
| > | testhi(a,b) | : a>b. Test if Higher. True=>1, false=>0 |
| | tesths(a,b) | : a>=b. Test if Higher or Same. True=>1, false=>0 |
| < | testlo(a,b) | : a<b. Test if Lower. True=>1, false=>0 |
| | testls(a,b) | : a<=b. Test if Lower or Same. True=>1, false=>0 |

| binary | Function | Description |
|---|---|---|
| ~ or ! | not(a) | : ~a. Logical NOT. |
| & | and(a,b) | : a & b. Logical AND. |
| \| | or(a,b) | : a ∧ b. Logical OR. |
| | vect(a,b,..) | Build a vector of the arguments. |
| | getbaseline(a) | Gets the baseline no. a for the actual measurement from the database. Use it like this: bl=getbaseline(1) |
| | incr(a) | : a+1. Increment a by 1. |
| | getlines(xmin, xmax,Nx,xd) | GetLines returns a vector [idx] of indices to the desired frequencies specified in vector [xd], for the (abcissa) vector specified by xmin,xmax,Nx. The function may be used for frequency and time domain signatures. |
| | db20(x) | = $20*\log_{10}(x/1)$. Returns the decibel-values of the elements in vector x, with reference to 1 (Unit). |
| | sigmoid(x,a,c) | Sigmoid curve membership function. Returns a matrix which is the sigmoid membership function evaluated at x (a constant). *params* is a 2-element vector that determines the shape and position of this membership function. Specifically, the formula for this membership function is: sigmf(x, a, c) = 1./(1 + exp(-a*(x-c))) |
| | cart2pol(x,y) | Convert from Cartesian co-ordinates to polar co-ordinates. x and y are vectors. Returns a matrix where the first row is the *r* vector (length), the second is the *f* vector (angle). The input vectors *x* and *y* express the abscissa and ordinate members. |

| binary | Function | Description |
|---|---|---|
| | pol2cart(r,t) | Suggested exchanging the existing 'pol_complex' function.<br><br>Convert from polar co-ordinates to Cartesian co-ordinates.<br><br>Returns a matrix where the first row is the x vector (abscissa), the second is the y vector (ordinate).<br><br>The input vector r expresses the length scale, the vector t the angle scale. |
| | getmeas(i) | Suggested exchanging the existing 'getmeas' function without parameters.<br><br>Gets the i'th measurement defined for the specific signature. |
| | getsizemeas() | Return the number of measurements assigned for this fault. |
| | getelem(x,i,j) | = x(i,j). Get element in the i'th row and j'th column in matrix x. If x is a vector j may be left out. |
| | fuzzymax(x,m) | = $\Sigma(x^m)^{1/m}$. Tends against the highest values in vector x; more exclusively by increasing value of the constant m. |
| | fuzzymin(x,m) | = $\Sigma(x^{-m})^{-1/m}$. Tends against the lowest values in vector x; more exclusively by increasing value of the constant m. |
| | fuzzygauss(x, m, xval, val, expo) | Fuzzy weighting function.<br><br>All input parameters are constants. |
| | orbitpara(mx, phx, my, phy) | Fundamental parameters of shaft orbit.<br><br>Returns a vector with 2 elements where the first is the length of the major axis and the second is the fraction between the length of the major and the minor axis.<br><br>The input constants mx and phx express the magnitude and phase of the x-signal (horizontal) and my and phy express the magnitude and phase of the y-signal (vertical). |

| binary | Function | Description |
|---|---|---|
| | squareness(rvec,d,rpm) | Identification of shaft orbit's relation to an unbalance response.<br><br>Express how large a portion of the estimated value at *rpm* that is due to the quadratic term in the approximation, made by a second order polynomial fit.<br><br>*rvec* is vector of rpm values, *d* is a vector of corresponding displacement values, and *rpm* is the speed where the fit is tested. |
| | sumsquare(x) | = $\Sigma\, x(i)^2$. Sum of squares of the elements in vector *x*. |
| | vectortrunc(x,i,j) | Vector truncation.<br><br>Returns a vector with the *i'th* to the *j'th* elements from the vector *x*. |
| | max(x) | = max(x). Gets the maximum value of the elements in the vector x. |
| | min(x) | = min(x). Gets the minimum value of the elements in the vector x. |
| | kurtosis(x) | Calculate the kurtosis of the elements in the vector x. |
| | now | Returns the current date and time as a serial date number. FLOOR(NOW) is the current date and REM(NOW,1) is the current time. (Identical with the MATLAB command NOW) |
| | abs(x) | Returns the absolute value of the elements in the vector x. |
| | sign(x) | Returns the sign of the elements in the vector *x*, i.e. −1 if the element is less than 0 else 1. |
| | mean(x) | = $x_i/N$. Returns the mean value of the elements in vector x. |
| | std(x) | Returns the standard deviation of the elements in vector x. |
| | log10(x) | = $\log_{10}(x)$. Returns the logarithm with base 10 of the elements in vector x. |
| | linspace(a,b,n) | Generates a vector of *n* points linearly spaced between and including *a* and *b*. |
| | rowsize(x) | Returns the number of rows in matrix *x*. |
| | getclm(x,j) | Returns the *j'th* column from matrix *x*. |

| binary | Function | Description |
|---|---|---|
| | getrow(x,i) | Returns the *i*th row from matrix *x*. |
| | clmsize(x) | Returns the number of columns in matrix x. |
| | getmaxvalues(a) | GetMaxValues returns the largest value of FUNCTION around the abscissa values <LINES> ± Dlines |
| | return(s,ss) | Set the symptom & symptomstrength. |
| | gethist(measno, elmno, start, end) | Returns a vector with all elements on position *elemno* in measurement *measno* from date and time *start* to date and time *end*. |
| | getBode(i) | Called from signature: OTAreturn s v=[{]O1{]},{]O2{]},{<O1},{<O2}]To workspace: {RPM$_{min}$, RPM$_{max}$, nRPM} ... from last run-up. |
| | getSCL | Called from signature: GAP (scalar DC)<br><br>Returns the co-ordinates of the Shaft Centre Line, [x,y]. Measurements are based on DC readings from two DPs mounted in arbitrary directions and the x,y co-ordinates are calculated using spatial transformation.<br><br>To workspace: RPM<br><br>Question: from which GAP sensor is this callable and how is the other recognised?? |

The invention claimed is:

1. A method of automatic fault diagnosis including: for each of a plurality of components of machines, carrying out the steps of: for at least one possible fault in the component: calculating for each of a plurality of symptoms for indicating a fault, a symptom value and a symptom severity value as the function of a reduced data set calculated from measured data as a measure of the deviation of the measured data from base line values; obtaining a total fault symptom strength value from the symptom value and the symptom severity value indicating the strength of the fault; and determining whether the total fault symptom strength value lies above a first predetermined value for that fault, recalling stored data relating to the total fault system strength value as a function of time, fitting the stored data to a trend line and predicting the time when the total fault symptom strength value will exceed a second predetermined value, selecting a message based on the total fault symptom strength value and the predicted time, and outputting the selected message.

2. A method according to claim 1 wherein the reduced dataset is stored in a database and the method further includes automatically taking measurements of the component when a predetermined condition occurs, calculating new reduced data, testing whether the new measurements represent a significant change on the reduced data stored in the signature database, and storing the new reduced data in the database if the step of testing indicates a significant change.

3. A method according to claim 2 wherein the method further includes classifying the operation state of the data, comparing the new reduced data with reduced data from the same operation state and storing the new reduced data in the database indexed by the operation state.

4. A method of automatic fault diagnosis for machinery having a plurality of components, based on a reduced dataset calculated from data measured on the machinery, the method comprising: for at least one machine component, and for at least one fault that may occur in that component, carrying out the steps of: calculating for each of a plurality of symptoms for indicating that fault, a symptom value and a symptom severity value as a function of the reduced dataset calculated from measured data as a measure of the deviation of the measured data from base line values; combining the symptom values and symptom severity values to give a total fault symptom strength value indicating the strength of the fault; and carrying out fault processing if the total fault symptom strength lies above a predetermined value.

5. A method according to claim 4, including classifying the operation state of the machine and recording the classification of operation state together with the measured data in the reduced dataset and calculating the symptom values from data from selected classification states.

6. A method according to claim 5 wherein in addition to a symptom value representing the relative magnitude of deviation of measured values in a operation state from baseline values in an operation state a symptom strength representing the size of the measured values is calculated for each of the symptoms.

7. A method according to claim 4 wherein the total symptom strength of a fault is calculated from a fuzzy minimum of the system severity values and the fuzzy maximum of the symptom values.

8. A method according to claim 4 further including, if the total fault symptom strength for the fault lies below a first predetermined value, carrying out no further processing for that fault, and if the total fault symptom strength lies above the first which the value of the total fault symptom strength is not recorded on an ongoing basis to a second mode in which the total fault symptom strength is recorded on an ongoing time series basis.

9. A method according to claim 4 further comprising automatically starting a routine for checking the faults of a component at regular intervals, the routine calculating the total fault symptom values, and if necessary carrying out fault processing for each of a plurality of faults that may occur in that component.

10. A method according to claim 4 wherein the reduced dataset is stored in a database and the method further includes automatically taking measurements of the component when a predetermined condition occurs, calculating new reduced data, testing whether the new measurements represent a significant change on the reduced data stored in the signature database, and storing the new reduced data in the database if the step of testing indicates a significant change.

11. A computer program system recorded on at least one data carrier including code for causing a computer system to carry out the steps of: for each of a plurality of components of machines, carrying out the steps of: for at least one possible fault in the component: calculating for each of a plurality of symptoms for indicating a fault, a symptom value and symptom severity value as a function of a reduced data set calculated from measured data as a measure of the deviation of the measured data from base line values; obtaining a total fault symptom strength value from the symptom value and the symptom severity value indicating the strength of the fault stored in a database; and if the total fault symptom strength value lies above a first predetermined value for that fault, recalling stored data relating to the total fault system strength value as a function of time, fitting the stored data to a trend line and predicting the time when the total fault symptom strength value will exceed a second predetermined value, selecting a message based on the total fault symptom strength value and the predicted time, and outputting the selected message.

12. A computer program system according to claim 11 wherein a machine component object is provided for each of the machine components for which autodiagnosis is preformed.

13. A computer program system according to claim 12 wherein the program includes a number of general object classes corresponding to different types of machine component and the machine component objects are specific instances of the general object class corresponding most closely to the machine component, which specific instances inherit code relating to possible faults in the type of machine component from the general object class.

14. A computer program system according to claim 11 including code for automatically talking measurements of the component, calculating new reduced data, testing whether the new measurements represent a significant change on the reduced data stored in the database, and storing the new reduced data in the database if the step of testing indicates a significant change.

15. A computer program according to claim 14 further including code for classifying the operation state of the data, comparing the new reduced data with reduced data from the same operation state and storing the new reduced data in the database indexed by the operation state.

16. A computer program system recorded on at least one data carrier including code for causing a computer system to: for a plurality of faults that may occur in one or more machine components, carrying out in turn for each in turn the steps of: calculating for each of a plurality of symptoms for indicating that fault, a symptom value and a symptom severity value as a function of data stored in a database, the data being reduced data calculated from measured data; combining the symptom value and symptom severity value to give a total fault symptom strength value indicating the strength of the fault; and carrying out fault processing if the total fault symptom strength lies above a predetermined value.

17. A computer program according to claim 16, further comprising code for classifying the operation state of the machine and recording the classification of operation state together with the measured data in the reduced dataset.

18. A computer program according to claim 16 further including code for determining if the total fault symptom strength for the fault lies below a first predetermined value, and if so carrying out no further processing for that fault, and otherwise switching, for the fault, from a first mode in which the value of the total fault symptom strength is not recorded on an ongoing basis to a second mode in which the total fault symptom strength is recorded on an ongoing time series basis.

19. A computer program according to claim 16 further comprising code for starting a routine for checking the faults of a component at regular intervals, the routine calculating the total fault symptom value, and if necessary carrying out fault processing for each of a plurality of faults that may occur in that component.

20. A computer program according to claim 16 further including code for automatically taking measurements of the components when a predetermined condition occurs, calculating new reduced data, testing whether the new measurements represent a significant change on the reduced data stored in the signature database, and storing the new reduced data in the database if the step of testing indicates a significant change.

21. A system for automatically outputting a fault diagnosis for at least one possible fault, including code for carrying out the method of: for each of a plurality of components of machines, carrying out the steps of: for at least one possible fault in the component: calculating for each of a plurality of symptoms for indicating a fault, a symptom value and symptom severity value as the function of a reduced data set calculated from measured data as a measure of the deviation of the measured data from base line values; obtaining a total fault symptom strength value from the symptom value and symptom severity value indicating the strength of the fault stored in a database; and if the total fault symptom strength value lies above a first predetermined value for that fault, recalling stored data relating to the total fault system strength value as a function of time, fitting the stored data to a trend line and predicting the time when the total fault symptom strength value will exceed a second predetermined value, selecting a message based on the total fault symptom strength value and the predicted time, and outputting the selected message.

22. A system for automatically outputting a fault diagnosis for at least one possible fault, including code for carrying out the method of: for a plurality of faults that may occur in one or more machine components, carrying out in turn for each in turn the steps of: calculating for each of a plurality of symptoms for indicating that fault, a symptom value and a symptom severity value as a function of a reduced data set calculated from measured data as a measure of the deviation of the measured data from base line values combining the symptom value and a symptom severity value to give a total fault symptom strength value indicating the strength of the fault; and carrying out fault processing if the total fault symptom strength lies above a predetermined value.

23. A computer program system recorded on at least one data carrier including code for causing a computer system to carry out the steps of: for each of a plurality of components of machines, carrying out the steps of: for at least one possible fault in the component: calculating a total fault symptom strength value from measured data, including a symptom value and the symptom severity value, indicating the strength of the fault stored in a database; and if the total fault symptom strength value lies above a first predetermined value for that fault, recalling stored data relating to the total fault system strength value as a function of time, fitting the stored data to a trend line and predicting the time when the total fault symptom strength value will exceed a second predetermined value, selecting a message based on the total fault symptom strength value and the predicted time, and outputting the selected message.

* * * * *